(12) United States Patent
Yamakawa et al.

(10) Patent No.: US 8,675,035 B2
(45) Date of Patent: Mar. 18, 2014

(54) IMAGE FORMING APPARATUS AND OPTICAL SCANNING UNIT

(71) Applicants: Takeshi Yamakawa, Kanagawa (JP); Hiroshi Yoshizawa, Kanagawa (JP); Katsunori Shoji, Kanagawa (JP)

(72) Inventors: Takeshi Yamakawa, Kanagawa (JP); Hiroshi Yoshizawa, Kanagawa (JP); Katsunori Shoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/675,404

(22) Filed: Nov. 13, 2012

(65) Prior Publication Data

US 2013/0070042 A1 Mar. 21, 2013

Related U.S. Application Data

(63) Continuation of application No. 11/606,397, filed on Nov. 30, 2006, now Pat. No. 8,339,435.

(30) Foreign Application Priority Data

Nov. 30, 2005 (JP) ................................. 2005-346037

(51) Int. Cl.
   *B41J 27/02* (2006.01)
   *B41J 2/435* (2006.01)

(52) U.S. Cl.
   USPC ........... 347/258; 347/256; 347/257; 347/259; 347/242; 347/263

(58) Field of Classification Search
   USPC .................................. 347/263, 256–259, 242
   See application file for complete search history.

(56) References Cited

U.S. PATENT DOCUMENTS

| | | | |
|---|---|---|---|
| 6,072,516 A | 6/2000 | Yamakawa | |
| 6,157,478 A | 12/2000 | Naiki et al. | |
| 6,172,780 B1* | 1/2001 | Eom | 359/17 |
| 6,236,418 B1 | 5/2001 | Yamakawa | |
| 6,243,128 B1* | 6/2001 | Yamakawa | 347/263 |
| 6,342,963 B1* | 1/2002 | Yoshino | 359/204.1 |
| 6,593,951 B2 | 7/2003 | Yokoyama | |
| 6,829,001 B2 | 12/2004 | Yamakawa | |
| 6,839,157 B2* | 1/2005 | Ono et al. | 359/204.1 |

(Continued)

FOREIGN PATENT DOCUMENTS

| | | |
|---|---|---|
| JP | 09-179048 | 7/1997 |
| JP | 2001-296490 A | 10/2001 |

(Continued)

OTHER PUBLICATIONS

Office action corresponding to Japanese Patent Application No. 2005-346037 dated Apr. 2, 2013.

(Continued)

*Primary Examiner* — Sarah Al Hashimi
(74) *Attorney, Agent, or Firm* — Harness, Dickey & Pierce, P.L.C.

(57) ABSTRACT

An optical scanning unit may include a light source unit configured to emit a light beam, an optical housing configured to receive and support the light source unit, an optical device configured to deflect the light beam and to focus the light beam on a light receiving member, and a fixing member configured to fix the light source unit to the optical housing by applying pressure to the light source unit, wherein the pressure is applied in a direction, which is substantially perpendicular to an optical axis direction of the light source unit.

11 Claims, 8 Drawing Sheets

(56) References Cited

U.S. PATENT DOCUMENTS

| | | |
|---|---|---|
| 7,057,780 B2 | 6/2006 | Yoshizawa |
| 2002/0001118 A1 | 1/2002 | Nakajima et al. |
| 2003/0173508 A1 | 9/2003 | Tanaka et al. |
| 2004/0036975 A1 | 2/2004 | Slatkine |
| 2005/0012974 A1 | 1/2005 | Ono |
| 2005/0062836 A1* | 3/2005 | Nakajima .................... 347/225 |
| 2005/0105452 A1 | 5/2005 | Kimura |
| 2006/0209376 A1 | 9/2006 | Yamakawa |

FOREIGN PATENT DOCUMENTS

| | | | |
|---|---|---|---|
| JP | 2001296490 A | * | 10/2001 |
| JP | 2002-127497 | | 5/2002 |
| JP | 2002-182138 | | 6/2002 |
| JP | 2002-182141 | | 6/2002 |
| JP | 2004-034608 | | 2/2004 |
| JP | 2004-037836 | | 2/2004 |
| JP | 2004034608 A | * | 2/2004 |
| JP | 2004-109806 | | 4/2004 |
| JP | 2004-355007 A | | 12/2004 |
| JP | 2005-037629 A | | 2/2005 |
| JP | 2005-217135 A | | 8/2005 |
| JP | 2005217135 A | * | 8/2005 |
| JP | 2003-266787 | | 9/2006 |

OTHER PUBLICATIONS

Office Action dated Jan. 10, 2012 for corresponding Japanese Patent Application No. 2005-346037.

Search Report dated Jun. 4, 2008 for counterpart European Application No. 06256095.8-1251.

Japanese Patent Office Communication dated Apr. 12, 2011 issued in corresponding Japanese Application No. 2005-346037.

* cited by examiner

IMAGE FORMING APPARATUS AND OPTICAL SCANNING UNIT

PRIORITY STATEMENT

This application is a continuation application of U.S. application Ser. No. 11/606,397, filed Nov. 30, 2006, which claims priority under U.S.C. §119 to Japanese Patent Application No. 2005-346037, filed on Nov. 30, 2005, in the Japanese Patent Office (JPO), the entire contents of each of which are incorporated herein by reference.

TECHNICAL FIELD

Example embodiments generally relate to an image forming apparatus, for example, to an image forming apparatus having a fixing configuration for an optical scanning unit.

BACKGROUND

An image forming apparatus (e.g., copier, facsimile, and printer) may include an optical scanning unit for writing a latent image on an image carrier. Such an optical scanning unit may have various configurations, as required.

One optical scanning unit may use a semiconductor laser having a laser-emitting element as a light source. Such a semiconductor laser may be a laser diode (hereinafter, LD), for example.

Such an optical scanning unit may have a LD (laser diode) unit to hold the laser diode. The LD unit may be fixed to an optical housing of the optical scanning unit.

In general, the LD unit may be fixed to the optical housing with a fastening member such as screw, for example. In such a configuration, a position of the LD unit with respect to the optical housing may not be moved (or deviated) after fastening the LD unit to the optical housing.

However, if the LD unit is attached and fixed to the optical housing with an elastic member, for example, leaf spring, the LD unit may have some clearance with the optical housing, although such clearance may be small. In such a configuration, a position of the LD unit with respect to the optical housing may be relatively moved (or deviated) because of such clearance.

Such movement of the LD unit may change a position of the LD unit with respect to the optical housing, by which a direction of light beam emitted from the LD unit may be deviated from an optimal condition. Such a directional deviation of the light beam may cause a deviation of scanning line on an image carrier, for example, photoconductive member.

In case of a monochrome machine or single-beam machine, such directional deviation of light beam may not cause a significant degradation of image quality.

However, for a full-color machine having a plurality of photoconductive members (e.g., photoconductive drums), such directional deviation of light beams may cause a degradation of image quality, for example, misaligned color images.

Further, if a plurality of LD units may be used in the image forming apparatus, such directional deviation of light beams may cause pitch misalignment between each color on image carriers, by which image quality may degrade.

SUMMARY

Example embodiments relate to an optical scanning unit including a light source unit, an optical housing, an optical device, and/or a fixing member. The light source unit may emit a light beam. The optical housing may receive and support the light source unit. The optical device may deflect the light beam and focus the light beam on a light receiving member. The fixing member may fix the light source unit to the optical housing by applying pressure to the light source unit. The pressure may be constantly applied in a direction, which is substantially perpendicular to an optical axis direction of the light source unit.

Example embodiments also relate to an image forming apparatus having an optical scanning unit. The optical scanning unit may include a light source unit, an optical housing, an optical device, and/or a fixing member. The light source unit may emit a light beam. The optical housing may receive and support the light source unit. The optical device may deflect the light beam and focus the light beam on a light receiving member. The fixing member may fix the light source unit to the optical housing by applying pressure to the light source unit. The pressure is constantly applied into a direction, which is substantially perpendicular to an optical axis direction of the light source unit.

Example embodiments also relate to a fixing member including a base member and at least two stoppers on at least two sides of the base member, the at least two stoppers configured to maintain a positional relationship between an optical housing and a laser unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION OF EXAMPLE EMBODIMENTS

Figure 1:
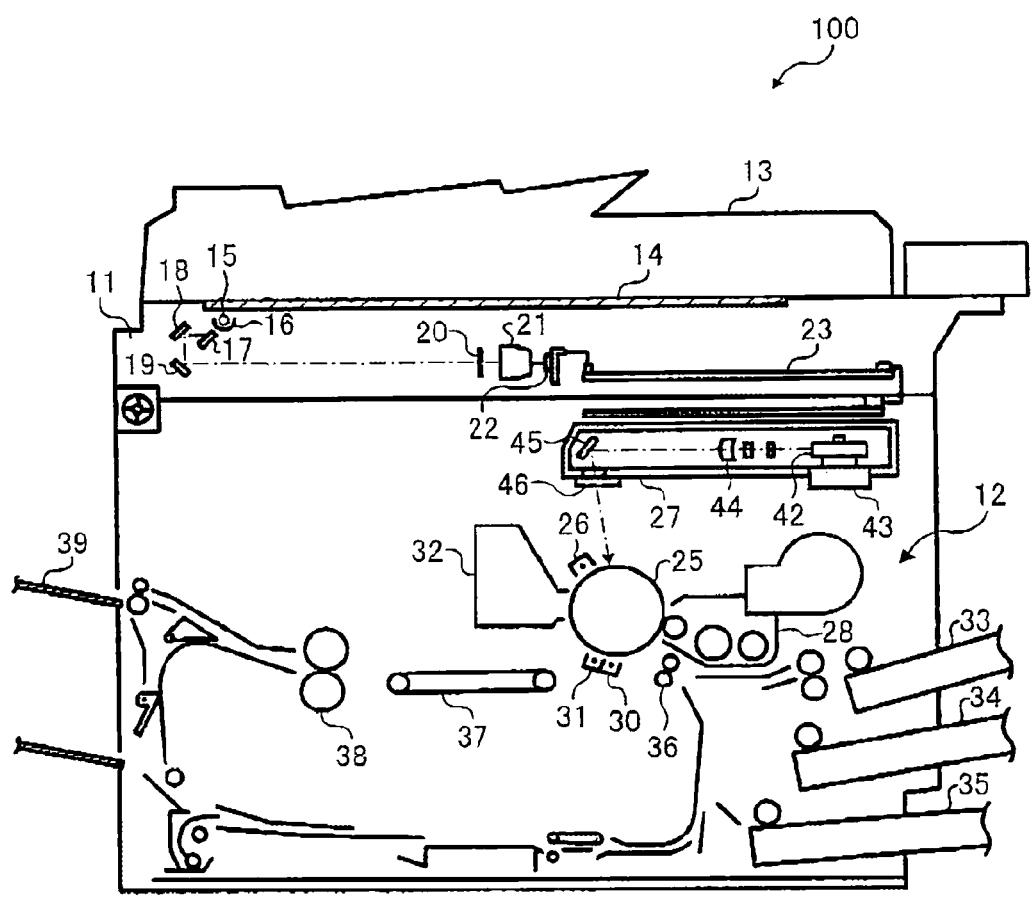
FIG. 1 is a schematic cross-sectional view of an image forming apparatus including an optical scanning unit according to an example embodiment.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Example embodiments of the present invention will be more clearly understood from the detailed description taken in conjunction with the accompanying drawings.

Various example embodiments of the present invention will now be described more fully with reference to the accompanying drawings in which some example embodiments of the invention are shown. In the drawings, the thicknesses of layers and regions may be exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Also, the use of the words "compound," "compounds," or "compound(s)," refer to either a single compound or to a plurality of compounds. These words are used to denote one or more compounds but may also just indicate a single compound.

Now, in order to more specifically describe example embodiments of the present invention, various embodiments of the present invention will be described in detail with reference to the attached drawings. However, the present invention is not limited to the example embodiments, but may be embodied in various forms. In the figures, if a layer is formed on another layer or a substrate, it means that the layer is directly formed on another layer or a substrate, or that a third layer is interposed therebetween. In the following description, the same reference numerals denote the same elements.

Although the example embodiments of the present invention have been disclosed for illustrative purposes, those skilled in the art will appreciate that various modifications, additions and substitutions are possible, without departing from the scope and spirit of the invention as disclosed in the accompanying claims.

Figure 2:
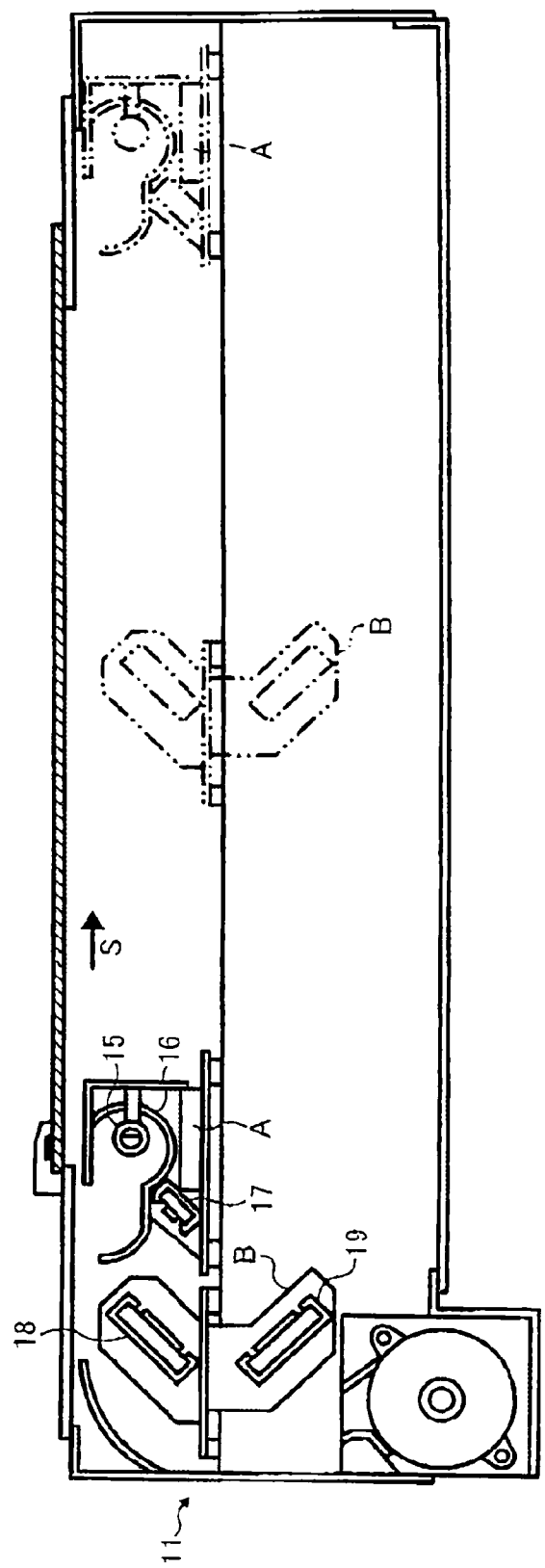
FIG. 2 is an example schematic cross-sectional view of a document scanner of an image forming apparatus of FIG. 1.
Figure 3:
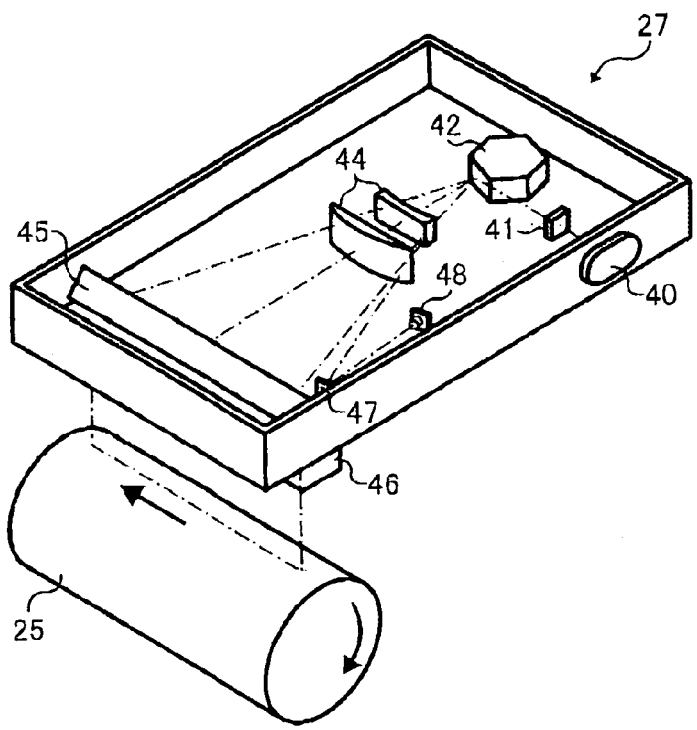
FIG. 3 is an example perspective view of an optical scanning unit included in an image forming apparatus of FIG. 1.

Referring now to the drawings, wherein like reference numerals designate identical or corresponding parts throughout the several views, an image forming apparatus according to an example embodiment is described with particular reference to FIGS. 1 to 3.

FIG. 1 is a schematic cross-sectional view of an image forming apparatus 100 including an optical scanning unit 27 according to an example embodiment. FIG. 2 is an example schematic cross-sectional view of a document scanner 11 of the image forming apparatus 100. FIG. 3 is an example perspective view of the optical scanning unit 27 included in the image forming apparatus 100.

Hereinafter, an example configuration and example operation of the image forming apparatus 100 is explained with reference to FIG. 1.

As shown in FIG. 1, the image forming apparatus 100 may include a document scanner 11, an image-forming unit 12, and/or an automatic document feeder 13, for example.

The image-forming unit 12 may include the optical scanning unit 27, which uses a light beam as light source, for example.

The automatic document feeder 13 may feed document sheets to a contact glass 14, one by one, for image scanning, and eject scanned sheets.

As shown in FIGS. 1 and 2, the document scanner 11 may include a first carriage A, a second carriage B, a color filter 20, a lens 21, a CCD (charge coupled device) sensor 22, and/or an image processor 23, for example.

As shown in FIG. 2, the first carriage A may include a lamp 15 (as a light source), a reflecting mirror 16, and/or a first mirror 17, for example.

As also shown in FIG. 2, the second carriage B may include a second mirror 18, and/or a third mirror 19, for example.

When the document scanner 11 scans a document sheet, the first carriage A may move in a direction shown by arrow S with a constant speed, and the second carriage B may synchronously move with the first carriage A at one-half of the speed of first carriage A to optically scan the document sheet on the contact glass 14.

A light beam from the lamp 15 and reflecting mirror 16 may irradiate the document sheet on the contact glass 14.

The light beam reflected from the document sheet may be directed to the first mirror 17, second mirror 18, third mirror 19, color filter 20, and/or lens 21, and the light beam may be focused on the CCD sensor 22.

The CCD sensor 22 may convert the light beam reflected from the document sheet to an analog image signal (e.g., electric signal).

The CCD sensor 22 may include three CDDs corresponding to R(red), G(green), and B(blue) filter, for example, to scan a full color document.

When the document scanner 11 completes an image scanning operation, the first carriage A and second carriage B may return to a home position.

The CCD sensor 22 may output the analog image signal to an analog/digital converter. The analog/digital converter may convert the analog image signal to a digital image signal, and output the digital image signal to the image processor 23.

The image processor 23 may conduct various processes, for example, binarization of the image, multileveling of the image, gray-scale of the image, image enlargement/reducing, and/or image editing, for example.

As shown in FIG. 1, the image-forming unit 12 may include an image carrier 25, a charger 26, an optical scanning unit 27, a developing unit 28, and/or a transfer unit 30, for example.

When conducting an image forming operation, the image carrier 25 (e.g., photoconductive member), rotating in one direction by a driver (not shown), may be uniformly charged by the charger 26, and the image carrier 25 may be scanned by a light beam coming from the optical scanning unit 27 to form an electrostatic latent image on the image carrier 25.

The digital image signal, processed in the above-mentioned image processor 23, may be transmitted to the optical scanning unit 27, and the light beam corresponding to the digital signal may be irradiated to the image carrier 25.

The developing unit 28 may develop the electrostatic latent image on the image carrier 25 as a visible image, for example, a toner image.

As shown in FIG. 1, the image forming apparatus 100 may also include sheet feeders 33, 34, and 35, which may store transfer sheets as recording media.

A transfer sheet may be fed to a registration roller 36 in the image-forming unit 12 from any one of the sheet feeders 33, 34, and 35.

The registration roller 36 may feed the transfer sheet to a space between the image carrier 25 and the transfer unit 30 at a given timing so that a toner image on the image carrier 25 may be transferred to the transfer sheet.

After transferring the toner image to the transfer sheet, the transfer sheet may be separated from the image carrier 25 by a separator 31, and transported to a fusing unit 38 by a transporter 37.

After the toner image is fixed on the transfer sheet by the fusing unit 38, the transfer sheet is ejected to a tray 39, which may be provided to the image forming apparatus 100.

After separating the transfer sheet from the image carrier 25, a cleaning unit 32 may remove toner remaining on the image carrier 25 to prepare for a next image forming operation.

The image forming apparatus 100 may include many types of machines, for example, a monochrome machine or multi-color machine. The image forming apparatus 100 may employ various types of internal configurations, for example, intermediate transfer unit, tandem-arranged image carriers, for example. The image forming apparatus 100 may further include various apparatuses, for example, copier, printer, facsimile, and multi-functional apparatus having a plurality of functions such as copying, printing, facsimile, and scanning, for example.

Hereinafter, an example optical scanning unit 27 is explained with reference to FIGS. 1 and 3.

As shown in FIG. 3, the optical scanning unit 27 may include a LD (laser diode) unit 40, a cylindrical lens 41, a polygon mirror 42, a polygon motor 43 (see FIG. 1), a f-theta lens 44, a reflecting mirror 45, a dustproof glass 46, a synchronizing detection mirror 47, and/or a synchronizing detection sensor 48, for example.

The LD unit 40 may use a semiconductor laser as a light source, for example.

A light beam may be emitted from the light source. The light beam may be converted to a light beam having parallel light flux by a collimator lens (not shown) in the LD unit 40. The light beam may be directed to the cylindrical lens 41 by passing through an aperture (not shown) of the LD unit 40. The light beam may be compressed in a sub-scanning direction by the cylindrical lens 41, and enter the polygon mirror 42.

The polygon mirror 42 may have a regular polygonal shape such as hexagonal shape, for example. The polygon mirror 42 may be rotated with a constant speed by the polygon motor 43 (see FIG. 1) in a given direction.

Several factors, for example, rotational speed of the image carrier 25, optical writing density of the optical scanning unit 27, and a number of mirrors of polygon mirror 42 may determine a rotational speed of the polygon mirror 42.

The light beam directed on the polygon mirror 42 may be deflected by the polygon mirror 42 as a light beam having a constant angular velocity, and enter the f-theta lens 44.

The f-theta lens 44 may convert the light beam having the constant angular velocity to a light beam having a uniform velocity, which may be used for scanning the image carrier 25.

The light beam passed through the f-theta lens 44 may be focused on the image carrier 25 via the reflecting mirror 45 and dustproof glass 46.

The f-theta lens 44 may correct an optical face tangle error for the scanning system.

A light beam passed through the f-theta lens 44 may be reflected by the synchronizing detection mirror 47, and guided to the synchronizing detection sensor 48, wherein such light beam is not used for image forming.

The synchronizing detection sensor 48 may detect the light beam and output a detection signal, which may be used to start image forming in a main scanning direction.

Hereinafter, the LD unit 40 and an example optical housing 60 of the optical scanning unit 27 are explained.

Figure 4:
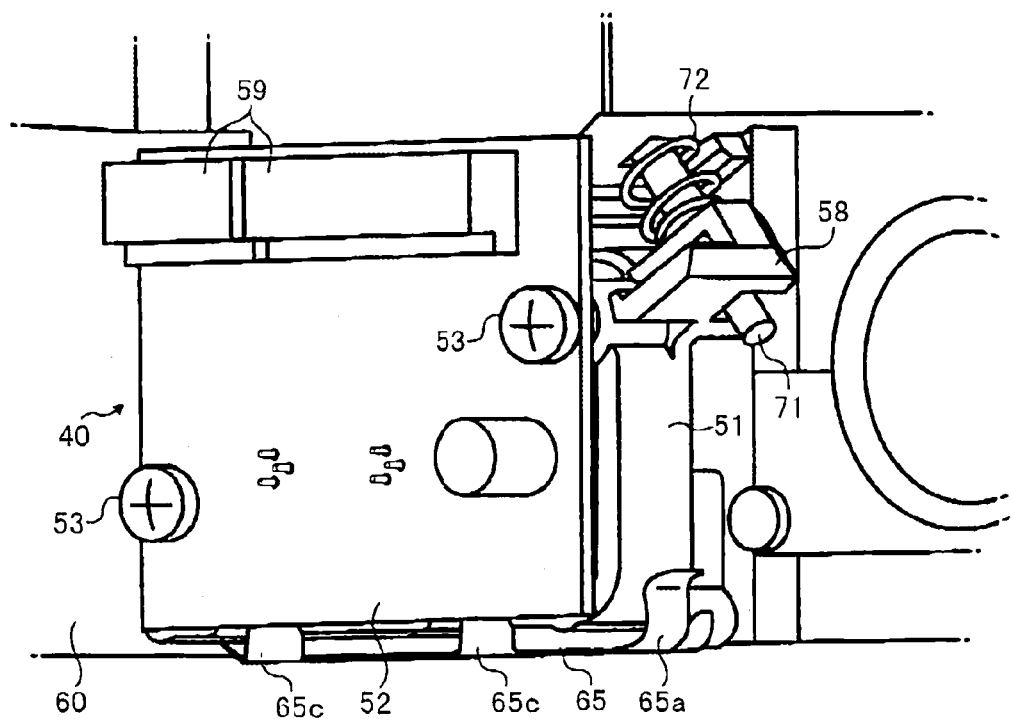
FIGS. 4 and 5 are example perspective views of an LD unit attached to an optical housing.
Figure 5:
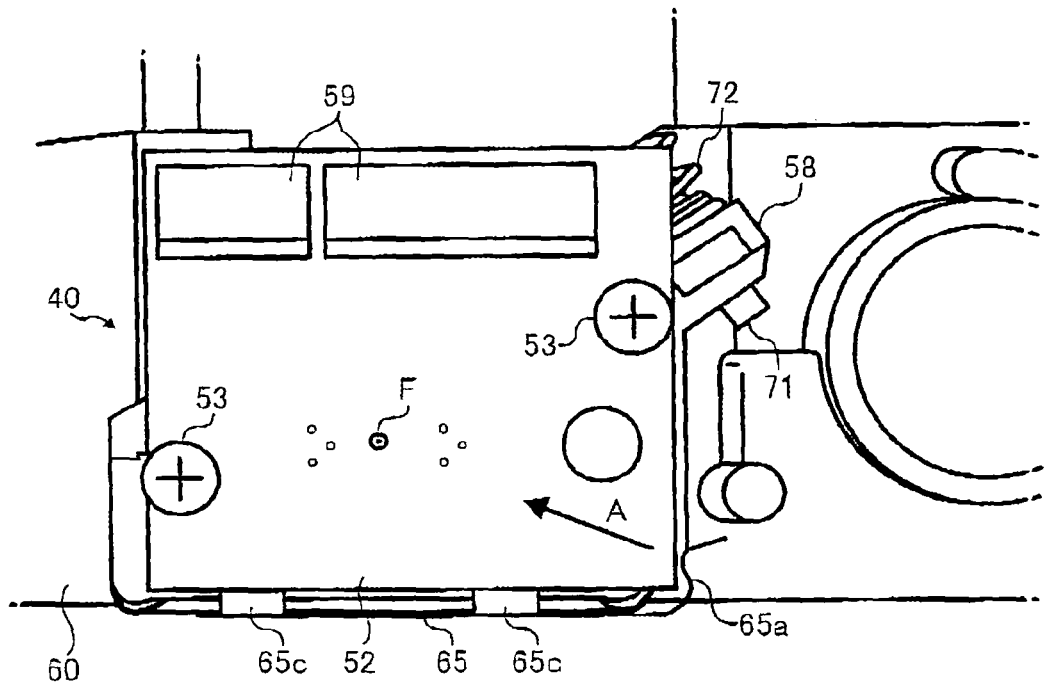

FIGS. 4 and 5 are example perspective views of the LD unit 40 attached and fixed to the optical housing 60 of the optical scanning unit 27.

The optical housing 60 may more precisely hold the above-explained optical parts shown in FIG. 3.

As shown in FIG. 4, the LD unit 40 may include a holder 51 and/or a LD board 52, for example.

The LD board 52 may be fixed to the holder 51 with one or more screws 53, for example.

Figure 6A:
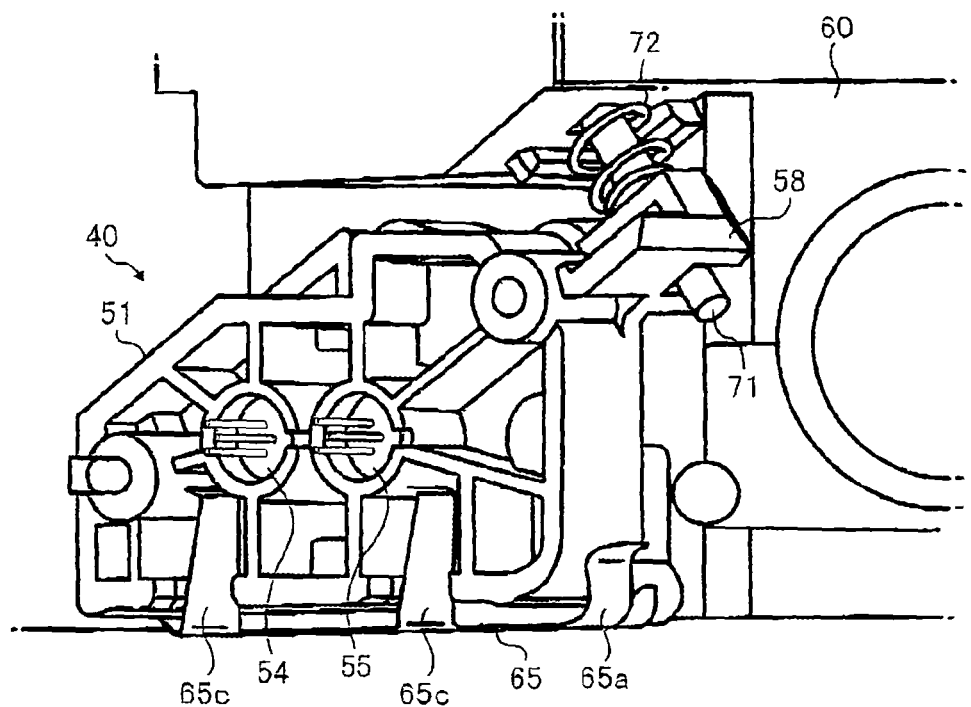
FIG. 6A is another example perspective view of an LD unit attached to an optical housing, in which a LD board is removed from an LD unit.

FIG. 6A is another example perspective view of the LD unit 40 attached to the optical housing 60, in which the LD board 52 is removed from the LD unit 40.

As shown in FIG. 6A, two semiconductor lasers 54 and 55 may be inserted in the holder 51, for example.

Although the LD unit 40 shown in FIG. 6A employs two-beam unit such as two semiconductor lasers 54 and 55, the LD unit 40 may also employ one-beam unit using one semiconductor laser.

Figure 7:
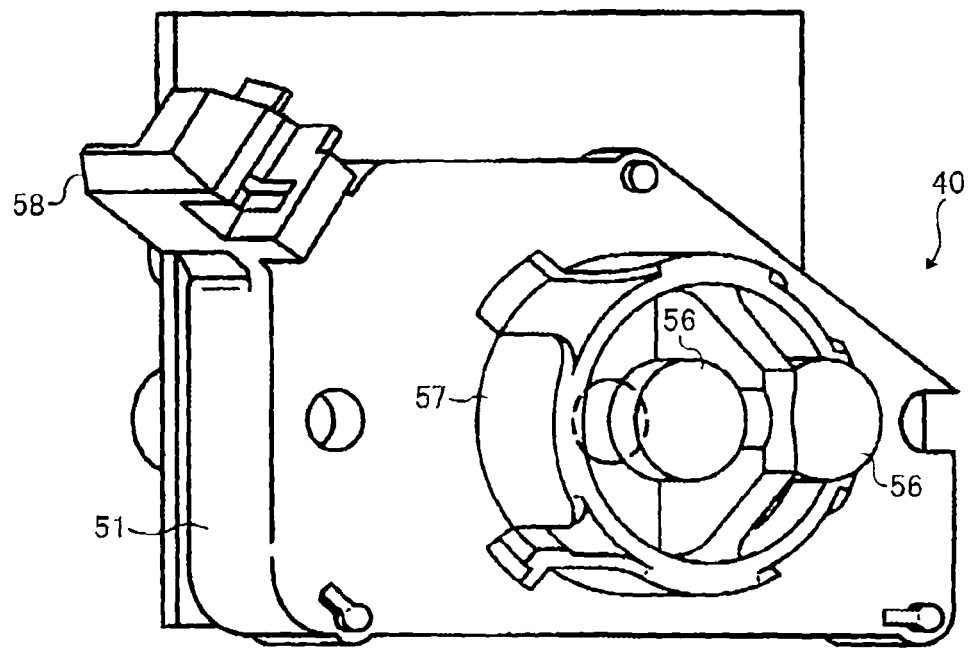
FIG. 7 is another example perspective view an LD unit, viewed from another side of LD unit.

The holder 51 may further include a collimator lens 56 (see FIG. 7). The collimator lens 56 may be used for adjusting a focusing level and an optical axis direction of the light beam, emitted from the semiconductor lasers 54 and 55.

FIG. 7 is another example perspective view of the LD unit 40, viewed from another side of LD unit 40. As shown in FIG. 7, the holder 51 may further include a cylinder-like member 57, protruding from an inner face of the holder 51.

Figure 8:
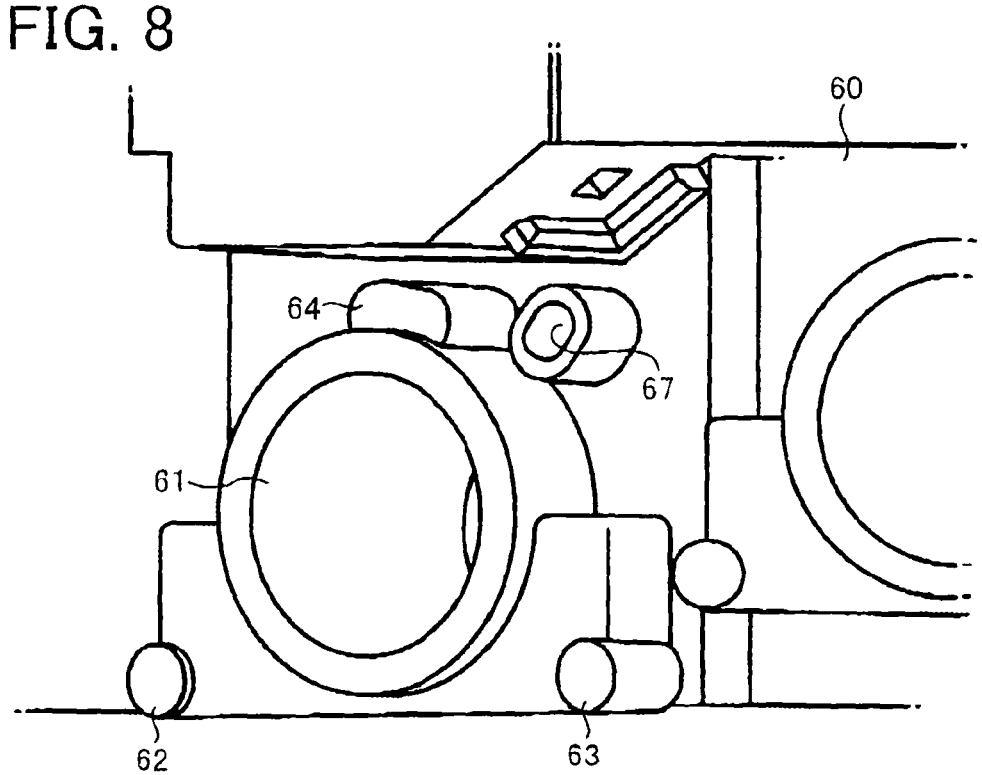
FIG. 8 is an expanded example view of an area of an optical housing, to which a LD unit is attached.

FIG. 8 is an expanded view of an area of the optical housing 60, to which the LD unit 40 may be attached.

As shown in FIG. 8, the optical housing 60 may include an attachment hole 61. The attachment hole 61 may be a cylindrically shaped hole, for example.

The cylinder-like member 57 may be engaged with the attachment hole 61 when attaching the LD unit 40 to the optical housing 60.

As also shown in FIG. 8, boss members 62, 63, and 64 may be provided around the attachment hole 61, for example.

The LD unit 40 may be securely attached and fixed to the optical housing 60 with a leaf spring 65 as explained below.

In example embodiments, the leaf spring 65 may be used as a fixing member to fix the LD unit 40 to the optical housing 60. The leaf spring 65 may apply pressure to the LD unit 40 in several ways, which will be explained below.

For example, the LD unit 40 may be attached to the optical housing 60 first.

The leaf spring 65 may be attached to the LD unit 40 and optical housing 60 from a lower side as shown in FIGS. 4 and 5.

The leaf spring 65 may sandwich the LD unit 40 and optical housing 60 with stoppers, by which the leaf spring 65 may apply pressure to the LD unit 40 to fix the LD unit 40 to the optical housing 60.

Figure 6B:
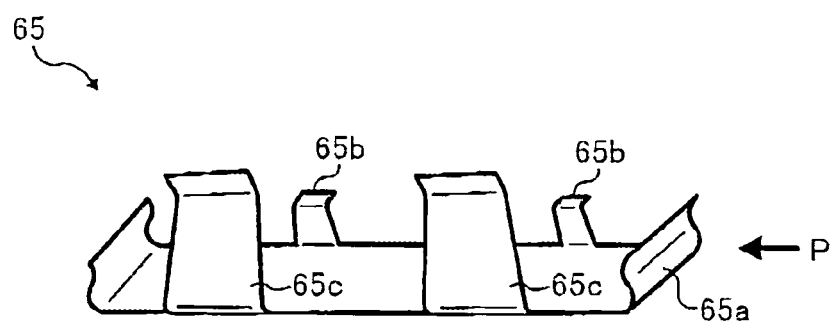
FIG. 6B is an example perspective view of a leaf spring used for fixing a LD unit to an optical housing.
Figure 6C:
FIG. 6C is an example cross-sectional view of a leaf spring, viewed from one direction.

As shown in FIGS. 6A, 6B, and 6C, the leaf spring 65 may include a plurality of stoppers, which are used to bias the LD unit 40 toward the optical housing 60.

For example, the leaf spring 65 may have an end stopper 65a, a front stopper 65c, and a rear stopper 65b as shown in FIGS. 6A, 6B, and 6C.

FIG. 6B is an example schematic view of the leaf spring 65. FIG. 6C is an example sectional view of the leaf spring 65, viewed from a direction shown by an arrow P.

As shown in FIGS. 4 and 5, the leaf spring 65 may have one or more end stoppers 65a at an end of the leaf spring 65 (e.g., right side in FIGS. 4 and 5). The end stopper 65a will be explained below.

Although the leaf spring 65 shown in FIG. 6B has two front stoppers 65c and two rear stoppers 65b, the number of stoppers need not be limited to any specific number.

A lower leaf spring 165 to be explained later in conjunction with FIG. 13 may similarly have one or more front stoppers 165c and/or one or more rear stoppers 165b, for example.

As explained above, the optical housing 60 and LD unit 40 may be sandwiched by the leaf spring 65 having one or more stoppers 65a, 65b, and/or 65c.

As shown in FIG. 6A, the two front stoppers 65c may bias the holder 51 toward the optical housing 60.

With such a configuration, the holder 51 may be pressed to faces of boss members 62, 63, and 64 of the optical housing 60, by which the LD unit 40 may be more precisely positioned with respect to the optical housing 60.

Accordingly, an optical axis direction of the LD unit 40 may be set more precisely.

As shown in FIG. 4, the front stopper 65c of the leaf spring 65 may be inserted in a space between the holder 51 and LD board 52 to bias the holder 51 toward the optical housing 60.

In an example embodiment, a position of the LD unit 40 attached to the optical housing 60 may be adjusted in a rotational direction of the LD unit 40.

As explained above, the cylinder-like member 57 may engage with the attachment hole 61 when attaching the LD unit 40 to the optical housing 60.

In an example embodiment, the cylinder-like member 57 and attachment hole 61 may have a cylindrical shape as mentioned above.

In such a configuration, the LD unit 40 attached to the optical housing 60 may be moved slightly in a circumferential direction of the attachment hole 61 although the leaf spring 65 biases the LD unit 40 toward the optical housing 60.

Such movement of the LD unit 40 in the circumferential direction of the attachment hole 61 may be regulated by an adjustment mechanism as below explained.

Such an adjustment mechanism may include an adjustment holder 58, an adjustment screw 71, and/or a spring 72, for example, as shown in FIGS. 4, 5, and 6A.

As shown in FIGS. 4 and 5, the LD unit 40 may include the adjustment holder 58 at an upper right corner of the holder 51.

The adjustment holder 58 having a hole (not shown) may protrude from the holder 51.

Figure 10:
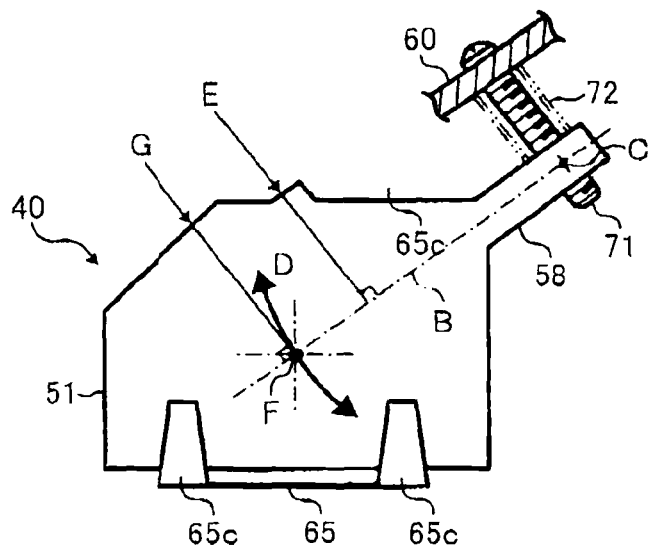
FIG. 10 is an example schematic view for explaining an adjustment mechanism for a LD unit.

As shown in FIG. 10, the adjustment screw 71 may be inserted in a hole of the optical housing 60, and the adjustment screw 71 may be inserted in the hole of the adjustment holder 58.

Accordingly, a position of the LD unit 40 in the rotational direction may be more precisely adjusted by rotating the adjustment screw 71.

The spring 72 shown in FIG. 6A may be provided around the adjustment screw 71 as biasing member.

Although not shown, a position of the LD unit 40 in the rotational direction may be adjusted with a motor or the like, for example.

A position of the LD unit 40 in the rotational direction may also be adjusted without using the above-mentioned adjustment mechanism.

In such a case, a boss (not shown) provided on the holder 51 of the LD unit 40 may be inserted in a hole 67 (see FIG. 8), provided on the optical housing 60, to set a position of the LD unit 40 in the rotational direction at a preferable or desired position. In other words, the position of the LD unit 40 may be fixed to a given position on the optical housing 60 with the boss (not shown) and hole 67.

As above described, a configuration according to an example embodiment may more precisely adjust a position of the LD unit 40 in the optical axis direction and/or rotational direction.

The attachment hole 61 of the optical housing 60 and the cylinder-like member 57 of the holder 51 may have a microscopic clearance therebetween so that the cylinder-like member 57 may be inserted in the attachment hole 61.

If an external force may occur to the LD unit 40, the LD unit 40, attached in the optical housing 60, may be moved in a direction perpendicular to the optical axis direction of the LD unit 40 because of such microscopic clearance.

For example, such an external force may occur to the LD unit 40 when a shock or vibration occurs to the optical scanning unit 27 or image forming apparatus 100, or when a connector is attached or detached to an adaptor 59 (see FIGS. 4 and 5) of the LD board 52 of the LD unit 40.

Hereinafter, the optical axis direction of the LD unit 40 may mean a vertical direction with respect to a sheet face of FIG. 5.

In view of such moving phenomenon, which may be caused by the microscopic clearance and external force, the leaf spring 65, which may press the LD unit 40 toward the optical housing 60, may include one or more end stoppers 65*a*, as shown in FIGS. 4 to 6.

The end stopper 65*a* may constantly bias the holder 51 in a direction shown by an arrow A in FIG. 5. Accordingly, the end stopper 65*a* may be included to the leaf spring 65 as a biasing portion.

The direction shown by an arrow A in FIG. 5 may be substantially aligned with a center F of the LD unit 40.

With such a configuration, the LD unit 40 may be constantly biased to the attachment hole 61 from one direction, for example.

Accordingly, the LD unit 40 may be fixed to the optical housing 60 in a stable manner over the time after attaching the LD unit 40 to the optical housing 60 and adjusting a position of the LD unit 40 in the rotational direction of the LD unit 40.

If the LD unit 40 is moved (or deviated) in a direction perpendicular to the optical axis direction of the LD unit 40 after attaching the LD unit 40 to the optical housing 60, a direction of light beam from the LD unit 40 may deviate from an optimal condition, by which such light beam may not scan a surface of an image carrier correctly, and resulting into a degradation of image quality.

If the LD unit 40 having two light sources is moved (deviated) in a direction perpendicular to the optical axis direction of the LD unit 40 after attaching the LD unit 40 to the optical housing 60, a pitch between two light beams of two light sources may deviate from an optimal condition, and resulting into a degradation of image quality.

In an example embodiment, the leaf spring 65 may constantly bias the LD unit 40 as above described so that a movement of the LD unit 40 with respect to the optical housing 60 may be reduced or suppressed.

Accordingly, a degradation of image quality may be reduced or suppressed, and a higher image quality may be achieved over time.

Figure 9:
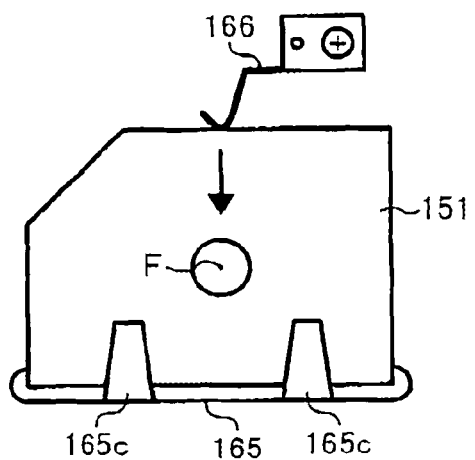
FIG. 9 is a schematic view of another biasing member for a LD unit according to another example embodiment.

Another configuration shown in FIG. 9 may be employed for biasing the LD unit 40 into a direction perpendicular to the optical axis of the LD unit 40, for example.

In another configuration shown in FIG. 9, a holder 151 of the LD unit 40 may be pressed by a lower leaf spring 165 and upper leaf spring 166.

The lower leaf spring 165 may have a front stopper 165*c* and a rear stopper 165*b* (see FIG. 13), by which the holder 151 may be biased in the optical axis direction of the holder 151.

The upper leaf spring 166 may bias the holder 151 into a direction to the center F of the LD unit 40 from an upper side of the holder 151. The upper leaf spring 166 may be used as biasing member.

In a configuration shown in FIG. 9, the lower leaf spring 165 may be used to bias the LD unit 40 toward the optical housing 60.

In the example configuration shown in FIG. 9, the leaf spring 65 (see FIG. 4) may bias the LD unit 40 toward the optical housing 60 by using the front stopper 65*c* and rear stopper 65*b* (see FIG. 6A to 6C), and bias the LD unit 40 into a direction perpendicular to the optical axis direction of the LD unit 40 by using the end stopper 65*a* (see FIGS. 6A to 6C).

In other words, the leaf spring 65 alone may bias the LD unit 40 from two different directions to fix the LD unit 40 to the optical housing 60 in a secured manner.

Hereinafter, the above-mentioned adjustment mechanism is explained in detail with reference to FIG. 10. FIG. 10 is an example schematic view for explaining the adjustment mechanism, which adjusts a movement of the LD unit 40 in a rotational direction of the LD unit 40.

As above described, the holder 51 may include the adjustment holder 58.

The adjustment screw 71 and the spring 72 may be attached to the adjustment holder 58 as shown in FIG. 10 (see FIG. 6A for perspective view of the adjustment mechanism).

The adjustment mechanism may adjust a movement of the LD unit 40, which may occur due to a clearance between the attachment hole 61 and cylinder-like member 57.

For example, the adjustment screw 71 and holder 51 may be linked at connection point C of the adjustment holder 58 as shown in FIG. 10.

Under such a condition, the LD unit 40 may be pivotable to some degree using the connection point C as point of support. Accordingly, the LD unit 40 may move in the rotational direction to some degree. Such movement of the LD unit 40 may occur in a direction shown by an arrow D.

In other words, the cylinder-like member 57 of the LD unit 40 may be moved (or rotated) in the attachment hole 61 within a clearance range in a direction shown by an arrow D in FIG. 10, although such movement range may be relatively small.

A movement of the cylinder-like member 57 in a direction shown by an arrow D may be restricted by biasing the holder 51 from a direction E or G shown in FIG. 10.

As shown in FIG. 10, the direction E or G may be substantially perpendicular to a line B, extending from the pivot point C (or point of support) to the center F of LD unit 40. The center F may be substantially aligned to a center of the attachment hole 61.

A biasing force to be applied from the direction G and a biasing force to be applied from the direction E may have a difference as set forth below.

The biasing force from the direction G may be substantially applied to the center F of LD unit 40, therefore such biasing force may not cause a rotational moment of the LD unit 40.

The biasing force from the direction E may not be applied to the center F of LD unit 40, therefore such biasing force may cause a rotational moment of the LD unit 40 in a counterclockwise direction in FIG. 10. Accordingly, such biasing force may effectively restrict a movement of the cylinder-like member 57 in a direction shown by an arrow D with such rotational moment.

Such a biasing force from the direction E, which is substantially perpendicular to the line B and not aligned to the center F, may also restrict movement of the adjustment mechanism having the adjustment holder 58, adjustment screw 71, and/or spring 72.

The point E shown in FIG. 10 may be determined by considering several factors, for example, layout, structure, and required functions of the LD unit 40, for example.

With the above-explained configuration, a biasing force having an improved rotational moment to the LD unit 40 may be applied to the LD unit 40.

As previously described, the end stopper 65*a* of leaf spring 65 or the spring 72 may apply a biasing force to the LD unit 40 from a direction, which is substantially perpendicular to the optical axis direction of the LD unit 40.

Figure 11:
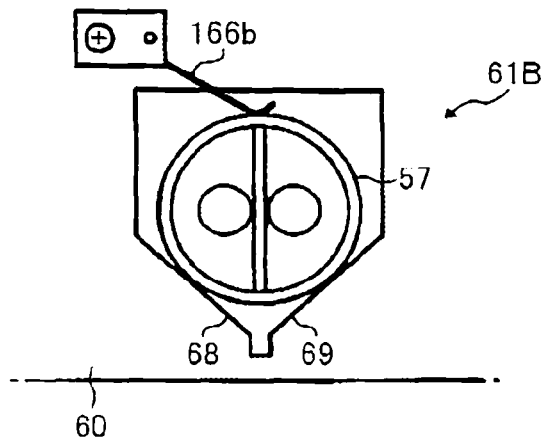
FIG. 11 is an example schematic view of another attachment hole of an optical housing.

Hereinafter, another example attachment hole is explained with reference to FIG. 11. FIG. 11 is a schematic view of an attachment hole 61B, provided to the optical housing 60.

As shown in FIG. 11, the attachment hole 61B may have a substantially pentagonal shape, for example.

The attachment hole 61B may have two faces 68 and 69, which are slanted as shown in FIG. 11.

As shown in FIG. 11, the cylinder-like member 57 of LD unit 40 may be biased toward the two faces 68 and 69 with an upper leaf spring 166b, provided over the cylinder-like member 57.

With such a configuration, the two faces 68 and 69 may support the cylinder-like member 57 when the LD unit 40 is attached to the optical housing 60.

Accordingly, the LD unit 40 may be attached to the optical housing 60 securely because the two faces 68 and 69 of attachment hole 61B support the cylinder-like member 57 and the biasing force of the upper leaf spring 166b may be applied to the cylinder-like member 57.

A direction of the biasing force from the upper leaf spring 166b may be substantially perpendicular to the optical axis direction of the LD unit 40.

The attachment hole 61B shown in FIG. 11 may have a pentagonal shape having two faces 68 and 69, wherein such pentagonal shape may support the cylinder-like member 57 as above described.

Although the attachment hole 61B may have a pentagonal shape in FIG. 11, the attachment hole 61B may have other shapes, which may support the cylinder-like member 57 in the above-described manner.

In the above explained example embodiments, a biasing member or biasing portion, which biases the LD unit 40 into a direction perpendicular to the optical axis direction of the LD unit 40, may employ a leaf spring, but other biasing members may be employed.

For example, the biasing member may include a coil spring, and/or chemical products, for example, rubber and/or plastic.

The LD unit 40 may include an elastic portion thereon, which may be used as biasing member.

Instead of using biasing member for directly biasing the LD unit 40, a link configuration may be employed for biasing the LD unit 40.

Figure 12:
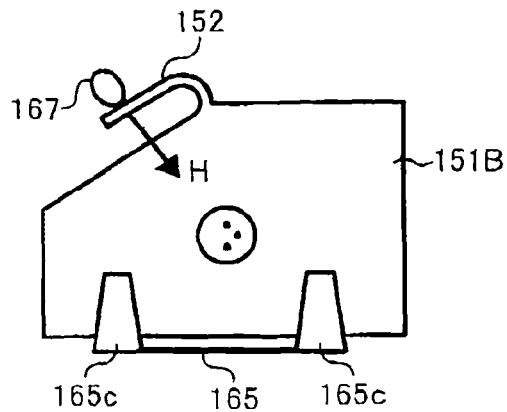
FIG. 12 is an example schematic view of another LD unit having an elastic member.

Hereinafter, another holder having an elastic portion is explained with reference to FIG. 12. FIG. 12 is an example schematic view of a holder 151B having an elastic portion 152.

As shown in FIG. 12, the holder 151B may be pressed to the optical axis direction of the holder 151B by a lower leaf spring 165, for example.

As shown in FIG. 12, the elastic portion 152 may be provided at an upper side of the holder 151B, for example.

When the holder 151B is attached to the optical housing 60, the elastic portion 152 may be contacted with a boss 167 provided on the optical housing 60.

Accordingly, the elastic portion 152 may constantly bias the holder 151B in a direction H, which is perpendicular to the optical axis direction of the holder 151B. The elastic portion 152 may be used as biasing member.

In a configuration shown in FIG. 12, a portion of the holder 151B may be formed as biasing member, by which a cost reduction and reduced-space for the LD unit 40 may be achieved.

Figure 13:
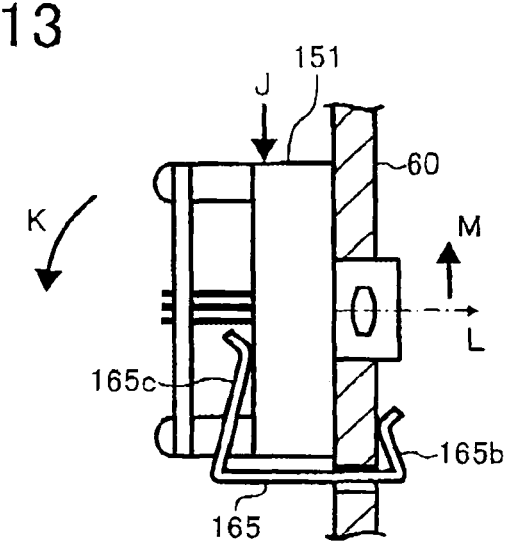
FIG. 13 is an example schematic cross-sectional configuration of a holder and an optical housing of FIG. 9, viewed from a cross-sectional direction of an optical housing.

FIG. 13 is an example schematic cross-sectional configuration of the holder 151 and the optical housing 60 (see FIG. 9), which is viewed from a cross-sectional direction of the optical housing 60.

As shown in FIG. 9, the holder 151 may be biased by the upper leaf spring 166 from an upper side of the holder 151.

If the upper leaf spring 166 applies a biasing force at a point J shown in FIG. 13, the LD unit 40 may receive a rotational moment in a direction shown by an arrow K in FIG. 13.

If a biasing force of lower leaf spring 165, which biases the holder 151 toward the optical housing 60, is sufficiently greater than a biasing force of the upper leaf spring 166, the rotational moment in the direction K may not cause a significant drawback.

However, too great a biasing force of the lower leaf spring 165 may not be preferable if the LD unit 40 may have the adjustment mechanism.

For example, if the lower leaf spring 165 has too large a biasing force, a friction force between the LD unit 40 and the optical housing 60 in the optical axis direction of the LD unit 40 may become too large.

In such a situation, a biasing force of the lower leaf spring 165 may be adjusted to a smaller value so that a smoother movement of the LD unit 40 in the rotational direction of the LD unit 40 may be achieved.

However, if the biasing force of the lower leaf spring 165 becomes too small, the LD unit 40 may receive a rotational moment in a direction shown by an arrow K (see FIG. 13) from the upper leaf spring 166, by which a direction of light beam L may deviate toward a direction M, for example.

Such a directional deviation of the light beam L may degrade an optical characteristic of the optical scanning unit 27 such as curving or inclination of scanning line on an image carrier, diameter deviation of light beam spot used for scanning. Such a phenomenon may result in a degradation of image quality.

Figure 14:
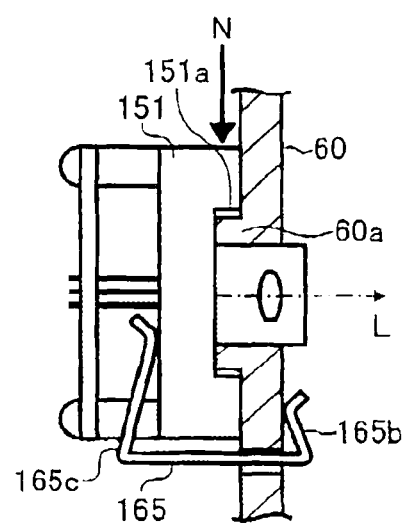
FIG. 14 is another example schematic cross-sectional configuration of a holder and an optical housing, in which rotational moment of the LD unit is reduced.

In view of such a phenomenon, the optical housing 60 may include a projected portion 60a, and the holder 151 may include a concaved portion 151a as shown in FIG. 14, for example.

As shown in FIG. 14, the projected portion 60a may engage with the concaved portion 151a.

The upper leaf spring 166 may apply a biasing force to the holder 151 at a position N, which is closer to a wall of the optical housing 60 as shown in FIG. 14.

In a configuration shown in FIG. 14, a biasing force of upper leaf spring 166 may be received by the projected portion 60a of the optical housing 60 via the concaved portion 151a.

Accordingly, the LD unit 40 may not receive a rotational moment, which may deviate a direction of light beam L used for scanning an image carrier.

Furthermore, the upper leaf spring 166 may bias the holder 151 of the LD unit 40 in a direction perpendicular to the optical axis direction of LD unit 40, by which the LD unit 40 may be fixed to the optical housing 60.

Therefore, the LD unit 40 may perform its function over time.

Accordingly, the image forming apparatus 100 having the optical scanning unit 27 may produce an image having a higher image quality over time because the LD unit 40 may be fixed to the optical housing 60 in a more secure manner as above described.

In the above explanation, a leaf spring may be used as a biasing member for biasing the LD unit 40 in a direction perpendicular to the optical axis of the LD unit 40. However, such a biasing member may include any configuration, for example, a coil spring.

A biasing direction and biasing position of biasing member may be changed within the scope of the present disclosure, as required. A configuration for an LD unit and/or an optical scanning unit may also be changed within the scope of the present disclosure, as required.

Numerous additional modifications and variations are possible in light of the above teachings. It is therefore to be understood that within the scope of the appended claims, the disclosure of example embodiments may be practiced otherwise than as specifically described herein.

This application claims priority from Japanese patent application No. 2005-346037 filed on Nov. 30, 2005 in the Japan Patent Office, the entire contents of which is hereby incorporated by reference herein.

What is claimed is:

1. An optical scanning unit, comprising:
a light source unit including a light source configured to emit a light beam;
an optical housing configured to receive and support the light source unit,
the light source unit being attached to the optical housing in an optical axis direction of the light source and fittable to the optical housing,
the optical housing setting a clearance around peripherals of the light source unit,
the optical housing including a projected portion that defines an opening through which the light source unit is supported in the optical housing along the optical axis direction of the light source;
a holder engaging the optical housing in the optical axis direction of the light source,
the holder including a concave portion that defines an other clearance around the projected portion of the housing,
the other clearance being perpendicular to the optical axis direction of the light source;
an optical device configured to deflect the light beam and to focus the light beam onto a light receiving member; and
a biasing member configured to apply a biasing force to the light source unit in a direction perpendicular to the optical axis direction of the light source at the concave portion of the holder with a presence of the clearance about the optical axis of the light source, wherein
the concave portion of the holder is spaced apart from the projected portion of the housing in the direction perpendicular to the optical axis direction of the light source, and
the biasing member is configured to apply the biasing force to the holder in the direction perpendicular to the optical axis of the light source at a position of the holder that is opposite the concaved portion of the holder in the direction perpendicular to the optical axis of the light source.

2. The optical scanning unit of claim 1, wherein the optical housing sets the clearance around the peripherals of the light source unit in the direction perpendicular to the light source unit.

3. The optical scanning unit of claim 1, wherein the biasing member includes a leaf spring.

4. The optical scanning unit of claim 1, wherein the light source includes at least one semiconductor laser.

5. An optical scanning unit, comprising:
a light source unit including a light source configured to emit a light beam;
an optical housing configured to receive and support the light source unit,
the optical housing including a projected portion that defines an opening, through which the light source unit is supported in the optical housing along an optical axis direction of the light source;
a holder contacting at least one of the light source unit and one surface of the projected portion of the optical housing, the holder defining a clearance around the projected portion of the optical housing;
an optical device configured to deflect the light beam and to focus the light beam onto a light receiving member; and
a biasing member configured to apply a biasing force through the holder to the light source unit in a direction perpendicular to the optical axis direction of the light source, wherein
the holder includes a concaved portion that defines the clearance around the projected portion of the housing,
the concave portion of the holder is spaced apart from the projected portion of the housing in the direction perpendicular to the optical axis direction of the light source, and
the biasing member is configured to apply the biasing force to the holder in the direction perpendicular to the optical axis of the light source at a position of the holder that is opposite the concaved portion of the holder in the direction perpendicular to the optical axis of the light source.

6. The optical scanning unit of claim 5, wherein the biasing member includes a leaf spring.

7. The optical scanning unit of claim 5, wherein the light source includes at least one semiconductor laser.

8. An optical scanning unit, comprising:
a light source unit including a light source configured to emit a light beam;
an optical housing configured to receive and support the light source unit,
the optical housing including a projected portion that defines an opening, through which the light source unit is supported in the optical housing along an optical axis direction of the light source;
a holder contacting at least one of the light source unit and one surface of the projected portion of the optical housing, the holder including a concave portion that defines a clearance around the projected portion of the optical housing;
an optical device configured to deflect the light beam and to focus the light beam onto a light receiving member; and
a biasing member configured to apply a biasing force through the concave portion of the holder to the light source unit in a direction perpendicular to the optical axis direction of the light source.

9. The optical scanning unit of claim 8, wherein the biasing member includes a leaf spring.

10. The optical scanning unit of claim 8, wherein the light source includes at least one semiconductor laser.

11. The optical scanning unit of claim 8, wherein
the concave portion of the holder is spaced apart from the projected portion of the housing in the direction perpendicular to the optical axis direction of the light source, and
the biasing member is configured to apply the biasing force to the holder in the direction perpendicular to the optical axis of the light source at a position of the holder that is opposite the concaved portion of the holder in the direction perpendicular to the optical axis of the light source.

* * * * *